(12) United States Patent
Onbilger et al.

(10) Patent No.: US 12,514,763 B2
(45) Date of Patent: Jan. 6, 2026

(54) MULTI-LAYERED ABSORBENT ARTICLE

(71) Applicant: EDGEWELL PERSONAL CARE BRANDS, LLC, Chesterfield, MO (US)

(72) Inventors: Derya Onbilger, Allendale, NJ (US); Rui Yang, Prompton Lakes, NJ (US)

(73) Assignee: Edgewell Personal Care Brands, LLC, Chesterfield, MO (US)

( * ) Notice: Subject to any disclaimer, the term of this patent is extended or adjusted under 35 U.S.C. 154(b) by 611 days.

(21) Appl. No.: 17/274,242

(22) PCT Filed: Sep. 17, 2019

(86) PCT No.: PCT/US2019/051484
§ 371 (c)(1),
(2) Date: Mar. 8, 2021

(87) PCT Pub. No.: WO2020/061026
PCT Pub. Date: Mar. 26, 2020

(65) Prior Publication Data
US 2021/0338493 A1 Nov. 4, 2021

Related U.S. Application Data

(60) Provisional application No. 62/732,187, filed on Sep. 17, 2018.

(51) Int. Cl.
*A61F 13/535* (2006.01)
*A61F 13/47* (2006.01)
(Continued)

(52) U.S. Cl.
CPC .......... *A61F 13/535* (2013.01); *A61F 13/472* (2013.01); *A61F 13/51104* (2013.01);
(Continued)

(58) Field of Classification Search
CPC .................. A61F 13/535; A61F 13/472; A61F 13/51104; A61F 2013/4706;
(Continued)

(56) References Cited

U.S. PATENT DOCUMENTS 6,090,089 A * 7/2000 Tsuji .................. A61F 13/15577
604/383
2005/0124957 A1* 6/2005 Giloh ................ A61F 13/51394
604/385.03
(Continued)

FOREIGN PATENT DOCUMENTS

CN 1209312 A 3/1999
CN 1336868 A 2/2002
(Continued)

OTHER PUBLICATIONS https://www.abena.com/knowledge-center/health-care-knowledge/continencecare/for-professionals/rothwell (Year: 2023).*
(Continued)

*Primary Examiner* — Nicholas J. Weiss
*Assistant Examiner* — Gabriella E Burnette
(74) *Attorney, Agent, or Firm* — Edgar Rodriguez

(57) ABSTRACT

An absorbent article for menstrual and/or incontinence purposes, having a unique two-layer acquisition and absorbent structure. The cover layer includes a nonwoven material. The absorbent core includes multiple strata including super absorbent, fiber material that is pulp and/or bicomponent fibers, and a binder material. The total thickness of the absorbent article is less than or equal to the thickness of absorbent articles of similar absorbent characteristics. The absorbent article includes various absorbent properties that are improved despite parity or reduction in overall thickness.

18 Claims, 4 Drawing Sheets

(51) Int. Cl.
  *A61F 13/472* (2006.01)
  *A61F 13/511* (2006.01)
  *A61F 13/53* (2006.01)
  *A61F 13/534* (2006.01)

(52) U.S. Cl.
  CPC .............. *A61F 2013/4706* (2013.01); *A61F 2013/53024* (2013.01); *A61F 2013/530386* (2013.01); *A61F 2013/5307* (2013.01); *A61F 2013/53445* (2013.01); *A61F 2013/5349* (2013.01)

(58) Field of Classification Search
  CPC .......... A61F 2013/53024; A61F 2013/530386; A61F 2013/5307; A61F 2013/53445; A61F 2013/5349; A61F 13/534; A61F 2013/530007; A61F 2013/530481; A61F 2013/53051
  See application file for complete search history.

(56) References Cited

U.S. PATENT DOCUMENTS

| | | | |
|---|---|---|---|
| 2006/0058746 A1 | 3/2006 | Poccia et al. | |
| 2006/0058747 A1* | 3/2006 | Nguyen | A61F 13/511 604/368 |
| 2006/0058749 A1* | 3/2006 | Rosenfeld | A61F 13/535 604/378 |
| 2011/0184366 A1* | 7/2011 | Carbonari | A61F 13/534 604/372 |

FOREIGN PATENT DOCUMENTS

| | | |
|---|---|---|
| JP | 2004065716 A | 3/2004 |
| JP | 2006-102529 A | 4/2006 |
| WO | 9611107 A1 | 4/1996 |

OTHER PUBLICATIONS

Unofficial translation of Japanese Office action issued May 9, 2023 in Japanese Patent Application No. 2021-513451.
Unofficial translation of Chinese Office Action & Search Report issued in connection with corresponding Chinese Application No. 201980060602.7 dated Feb. 11, 2022.
Decision of Final Rejection issued in Japan Patent Application No. 2021-513451, notification date Nov. 20, 2023.
International Search Report and Written Opinion issued from PCT Application No. PCT/US2019/051484 dated Mar. 26, 2020.
Unofficial translation of Pre-Appeal Review for Appeal No. 2024-004799, dated Jun. 10, 2024, for Japanese Patent Application No. 2021-513451.

* cited by examiner

MULTI-LAYERED ABSORBENT ARTICLE

CROSS-REFERENCE TO RELATED APPLICATIONS

This application is the National Phase of International Application No. PCT/US2019/051484, filed Sep. 17, 2019, claiming priority to U.S. Provisional Patent Application Ser. No. 62/732,187, filed Sep. 17, 2018, the contents of which are incorporated in its entirety herein.

BACKGROUND

The present disclosure relates to an absorbent article for menstrual and/or incontinence purposes. Specifically, the present disclosure relates to absorbent articles such as ultra-thins or liners.

Current absorbent products can be bulky and lack flexibility or sufficient absorption properties; such deficiencies lead to discomfort for a user when wearing the absorbent product. Current absorbent products can be difficult to manufacture and/or costly, as they require multiple components often made by different manufacturers.

SUMMARY

An absorbent article for menstrual or incontinence purposes is provided, such as a napkin, including a pad, liner, maxi or ultra-thin product. The absorbent article has a cover layer, and absorbent core structure, and a backsheet that is generally hydrophobic thereby preventing moisture from travelling through the absorbent article and onto the underlying garment (underwear, pants, etc. . . . ) The absorbent article optionally includes a transfer layer. In other embodiments, the properties of the transfer layer have been designed into the cover layer and/or the absorbent core. In such latter embodiments, the overall thickness of the pad is optionally reduced. In such latter embodiments, the overall thickness of at least one of the cover layer and the absorbent core is increased such that the thickness of the layer is greater than prior art products but still achieves a reduced thickness product. While such embodiments as contemplated throughout the present disclosure could be used in numerous forms to achieve a reduction in thickness, an ultra-thin or liner is preferred.

The absorbent article has a length, width and thickness, where the length is between about 150 mm to about 225 mm, and the width varies between about 45 mm to about 70 mm (at its widest portion). The total thickness of the cover, the optional transfer layer, and the absorbent core, is between about 0.9 mm and about 3.3 mm, or between about 1.5 mm and about 3.3 mm, and more preferably between 2.2 mm and about 2.8 mm, and more preferably between about 2.3 and about 2.6 mm. The cover, the optional transfer layer, and absorbent core, has a total weight of between about 1.3 to about 2.8 g. The cover, the optional transfer layer, and absorbent core, has a total basis weight (gsm) of less than about 240 gsm, or between about 170 gsm and about 220 gsm, or between about 180 gsm and about 200 gsm.

In some embodiments, the cover layer is a spunbound or spunlace material. The cover layer includes nonwoven fibers and/or synthetic fibers. In one embodiment, the cover layer includes a blend of fibers. In some embodiments, polypropylene, polyester, and/or polyethylene fibers are blended together. For instance, polyester and polypropylene fibers are blended, or polyethylene and polypropylene fibers are blended. Such ratios of fibers can be from about 1:3 to about 3:1, respectively, or said differently, between about 25% to about 75%, and between about 75% to about 25%, respectively. In some embodiments, the ratio of fibers can be approximately even, about 1:1, or about 50% each. In some embodiments, the cover layer has a basis weight that is between about 20 gsm and about 50 gsm. Preferably, the cover layer has a basis weight that is between about 25 gsm and about 30 gsm. In some embodiments, the cover layer is imaged spunlace that is hydroentangled. In some embodiments, the cover layer has a uniquely configured image or pattern. In some embodiments, the cover layer is a hot through air (HTA) nonwoven material.

Optionally, the cover layer is embossed having one or more protrusions separated by one or more channels. The cover layer includes a honeycomb embossed cover, the honeycomb being a repeating pattern of protrusions and channels across at least a portion of the absorbent article, such as a first end region, a second end region, and/or a central region, and/or a first lateral region, a central length region, and/or a second lateral region that is opposite the first lateral region. Preferably, the honeycomb pattern is a repeating pattern across the entirety of the absorbent article. The honeycomb pattern is aesthetically pleasing, is soft and pleasant to the touch (particularly as worn adjacent the body for extended periods of time), imparts the necessary structure to the absorbent article cover layer in order to offer improved performance characteristics.

Each of the one or more protrusions in the cover layer are separated by between about 0.0125 inches (0.31 mm) and about 0.0375 inches (0.95 mm), and more preferably, about 0.025 inches (0.64 mm). Each of the one or more protrusions in the cover have a height of between about 0.020 inches (0.50 mm) and about 0.040 inches (1.0 mm), and more preferably, about 0.030 inches (0.762 mm). Each the one or more protrusions has a length of between about 0.080 inches (2.0 mm) and about 0.10 inches (2.5 mm), and more preferably about 0.090 inches (2.3 mm). The length (or width, depending on your position with respect to the horizontal axis) of the individual hexagonal structure [which is a protrusion] is defined by the midpoint of an exterior side to the midpoint of an opposite exterior side, and thereby forms a perpendicular bisector between both sides; such length (or width, depending on your position with respect to the horizontal axis) is between about 0.15 inches (3.8 mm) and about 0.20 inches (0.50 mm), and more preferably about 0.16 inches (4.0 mm) to about 0.18 inches (4.6 mm), and more preferably, about 0.17 inches (4.32 mm).

An absorbent core includes an airlaid layer that is optionally 160 gsm multi-bonded airlaid nonwoven composed of Pulp, bicomponent fibers (BICO), SAP, and dispersion binder (glue)). The airlaid absorbent core layer optionally has two to four sub-components or strata, forming a single absorbent core. In some embodiments, each strata includes at least wood pulp and bicomponent fibers, and optionally super-absorbent material such as super-absorbent polymer. In some such embodiments, a first strata (or bottom strata) of the absorbent core includes pulp and bicomponent fibers. A second strata (or middle strata) includes pulp and bicomponent fibers, and optionally, super-absorbent. A third strata (or top strata) includes pulp, bicomponent fibers, and super-absorbent material. In such embodiments, the three airlaid strata are glued into a single material that can be transported for further manufacturing into an absorbent article.

In other embodiments a different absorbent core is provided. Such cores include a tissue strata as a first strata (or bottom strata). A second strata (or middle strata) includes pulp, BICO (or a pulp and BICO combination), and optionally super-absorbent. A third strata (or second middle strata) includes pulp, BICO (or a pulp and BICO combination), and optionally super-absorbent. A fourth strata (or top strata) includes pulp or BICO (or a pulp and BICO combination), material. In such embodiments, the tissue strata provide a substrate to deposit the airlaid strata onto it. In such embodiments, the addition of the fourth strata reduces the total height of the absorbent core (as opposed to an absorbent core with three strata).

The absorbent core material is between about 110 gsm and about 170 gsm, and more preferably between about 120 gsm and about 160 gsm. Having a more robust core material is preferred where the cover material is reduced in weight, where such combination of the core and cover enable a reduced thickness absorbent article. For example, the total thickness of the absorbent article is less than about 3 mm. Such thickness, in combination with structure and materials, enables and imparts advantageous properties and features contemplated throughout the present disclosure.

Super absorbent material comprises between about 20% and about 70% of the entire absorbent core, or between about 25% and about 55% of the entire absorbent core. Pulp or cellulosic fiber content is between about 30% and about 80% of the entire absorbent core, or between about 40% and about 75%.

Super absorbent materials such as super absorbent polymers, include but are not limited to, those commercialized by Nippon Shokubai, BASF, Evonik, and Sumitomo, such as SA55, SA60, SA65, SA65s, and SA70.

In some absorbent core embodiments having at least three strata including at least cellulosic pulp, super absorbent polymer is preferably between about 20% and about 30% of the total absorbent core composition, while the cellulosic pulp content is preferably between about 55% to about 70%.

In some embodiments, the absorbent core construction further includes a binder material such that the absorbent core can be made and transported to final assembly of the absorbent article. Such binders include dispersion binders. Some dispersion binders include latex, vinyl acetate and/or ethylene. Some dispersion binders of the present disclosure are aqueous polymer dispersions. The dispersion binder is applied throughout the entirety of the absorbent core, or at least along the bottom layer and top layer. The binder material is between about 0.5% and about 10% of the entire absorbent core.

In some absorbent core embodiments having at least three strata including at least pulp, the binder material is preferably between about 10% and about 15% of the total absorbent core composition.

In some embodiments, the absorbent core construction relies on hydrogen bonds to maintain the absorbent core in a unitary structure. In some embodiments, hydrogen bonds and a binder material maintain the absorbent core in a unitary structure.

Alternatively, the absorbent core is a tissue and superabsorbent construction, having a top tissue strata, a middle superabsorbent and adhesive strata, and a bottom tissue strata.

Optionally, the absorbent article includes an odor neutralizer agent that is applied and is expected to remain in the same position (applied to the airlaid).

The absorbent article includes positioning adhesive applied to the backsheet. The positioning adhesive includes multiple stripes that are covered by one or more pieces of release paper until the absorbent article is ready to be applied to a garment for use. In some embodiments, between about 5 and between about 25 lines of adhesive are applied, such that the stripes run the parallel to the length of the absorbent article or are perpendicular to the length. In alternate embodiments, positioning adhesive is applied in a rectangular or square pattern, at least about the ends of the absorbent article In some embodiments, the cover layer and absorbent core are assembled using laminating adhesive. In other embodiments, laminating adhesive is not required for such assembly, rather the products are assembled via heat and/or mechanical crimping.

Embodiments of the absorbent article as taught by the present disclosure are advantages over the prior art. For example, some embodiments of the absorbent article have a reduced thickness, which is difficult to achieve in ultra-thin and liner products that already have a reduced thickness. In further embodiments, such reduced thickness is to a degree that communicates to the consumer that the product will perform as intended and not fail or be susceptible to leakage. The absorbent article has a reduced weight as compared to prior art absorbent articles.

The absorbent article of the present disclosure is further advantageous in that it has improved flexibility as demonstrated by the Modified Circular Bend Procedure and results.

The absorbent article optionally has a simplified manufacturing process. In some embodiments, the absorbent article does not require a transfer layer. As such, only three layers (cover, absorbent core, backsheet) are required. Such simplified structure is advantageous from a cost perspective. Further still, in some embodiments, the absorbent core does not require vertical orientation when being assembled into the absorbent article.

The absorbent article of the present disclosure has further advantages. The p-time is decreased thereby moving fluid away from the cover layer more quickly and into the absorbent core, thereby providing improved dryness to the user. Surprisingly, the p-time is improved despite having a cover layer that is thicker than existing cover layers. The p-time is particularly advantageous in embodiments where the cover layer is bonded to the absorbent core by other than laminating adhesive (such as, by heat and/or crimping).

In some embodiments, the p-time is less than about 15 seconds, or more preferably, less than 10 seconds, or most preferably, less than 5 seconds. In some embodiments, p-time is two times faster, or more preferably, three times faster than current products.

The absorbent article of the present disclosure has improved rewet characteristics over prior art products. In some embodiments, the rewet is less than about 0.35 g, or more preferably, less than 0.25 g, or more preferably, less than 0.20 g. In some embodiments, the rewet is two times drier, or more preferably, three times drier than current products.

In yet further embodiments, the percentage of fluid distributed amongst the layers of the absorbent article reduces the amount of fluid adjacent the top surface (or body-side surface) of the cover layer. For example, existing products have a distribution where about a third of the fluid is disposed within the cover layer during rewet, and over half of the fluid is retained in the cover layer. The embodiments of the present disclosure are improved in that less than a third of the fluid is disposed within the cover during rewet, and more preferably, less than a fifth of the fluid. The embodiments of the present disclosure are further improved in that less than half of the total fluid retained in the absorbent article is located within the cover layer, and more preferably, less than a third of the fluid is retained in the cover. This is surprising in embodiments having a cover layer that is as thick or thicker than the cover layer of current products. For example, prior and current product offerings have a cover with a target thickness of 1.1 mm, with a minimum to target range of between 0.8 mm and 1.10 mm. In certain embodiments, cover layers of the based-on teachings of the present disclosure have a target thickness of 1.4 mm, with a minimum to maximum range (including the target) of 0.70 mm to 2.1 mm.

Additionally, the absorbent articles of the present disclosure are up to about 70% drier than existing products, and more preferably, are about 50% drier than existing products. In some embodiments, the absorbent articles of the present disclosure are about 80% drier than existing products.

DETAILED DESCRIPTION

Figure 1:
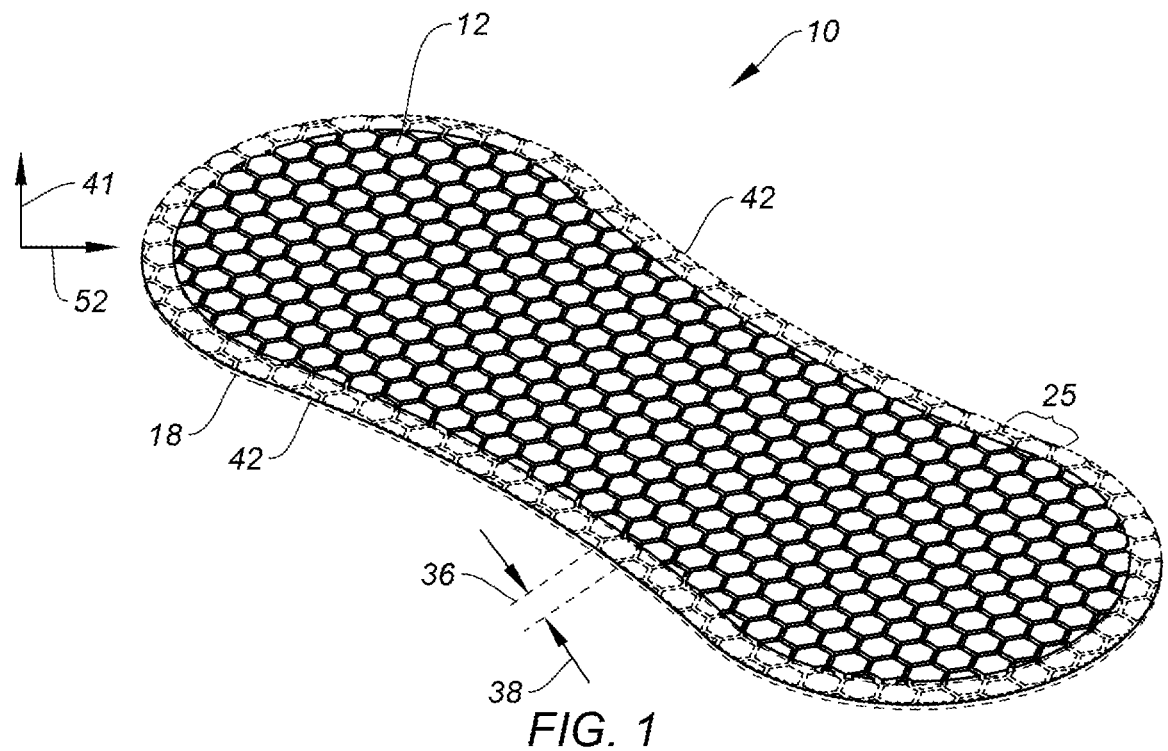
FIG. 1 shows an angled top view of an embodiment of the present disclosure.
Figure 1A:
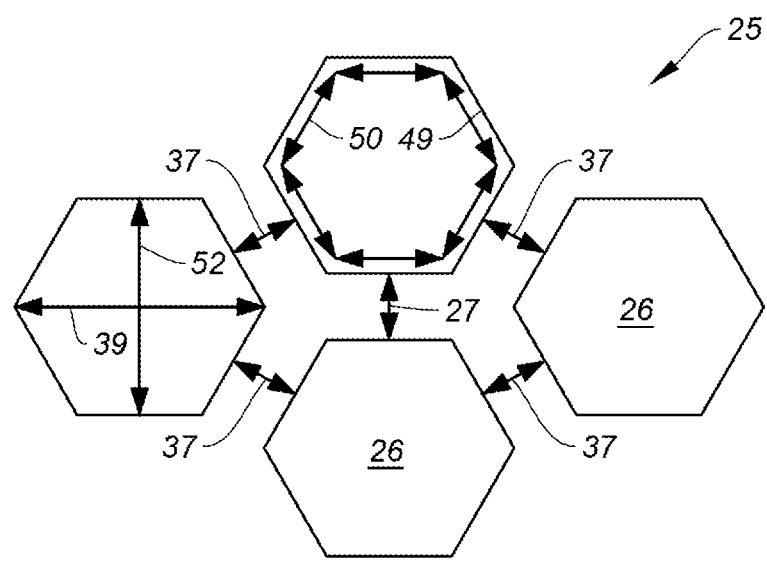
FIG. 1a shows a detail schematic view of an embodiment of a cover layer of the present disclosure.
Figure 2:
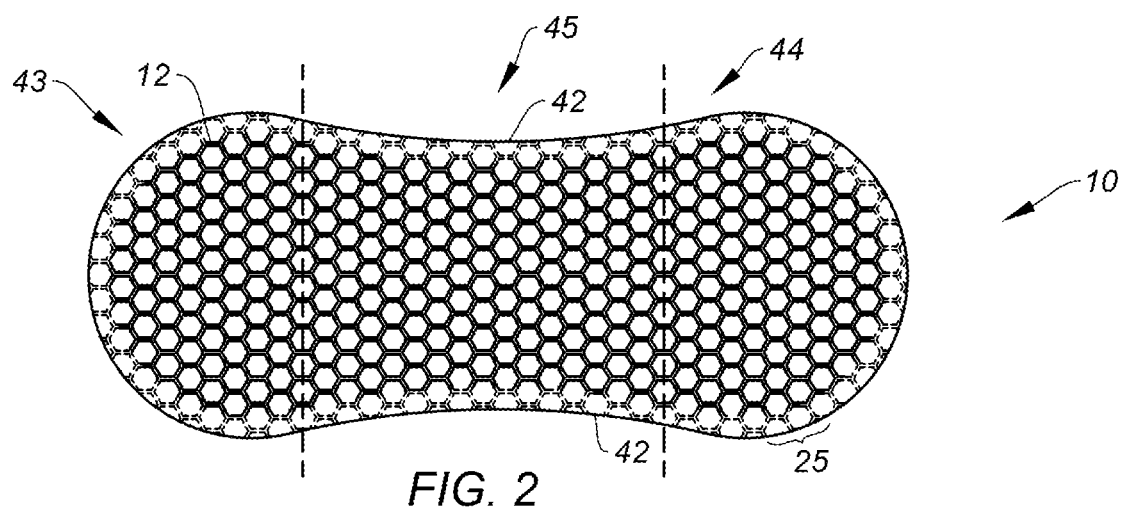
FIG. 2 shows a top view of a regular absorbent article embodiment of the present disclosure.
Figure 3:
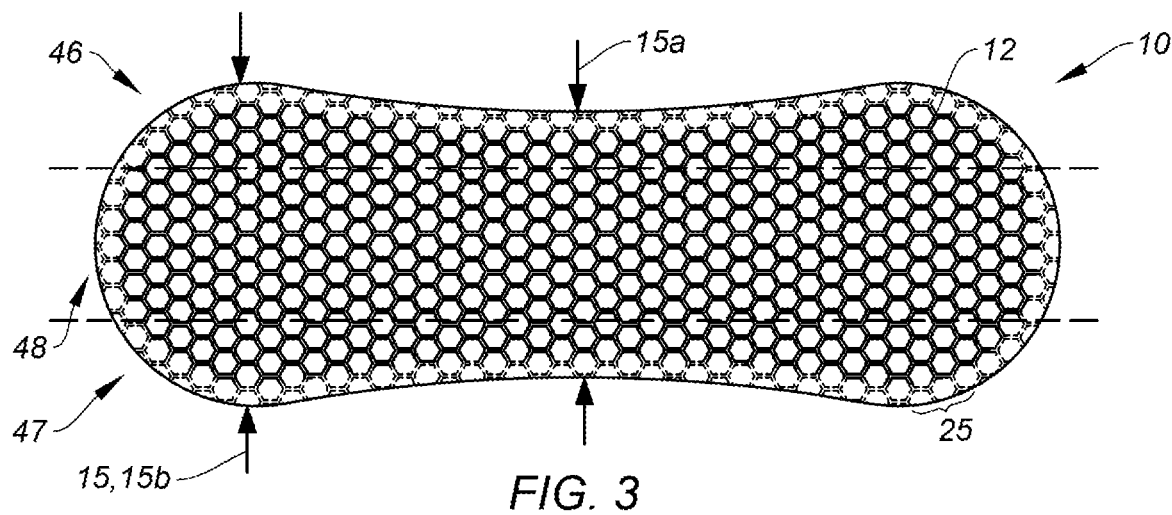
FIG. 3 shows a top view of a long absorbent article embodiment of the present disclosure.
Figure 4:
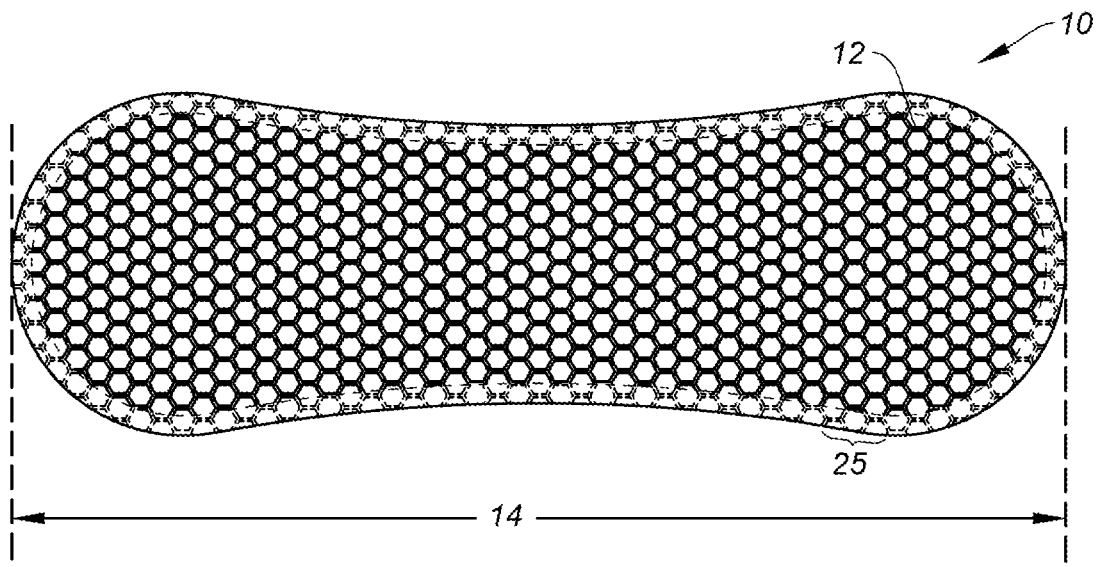
FIG. 4 shows a top view of an extra-long absorbent article embodiment of the present disclosure.
Figures 5, 6:
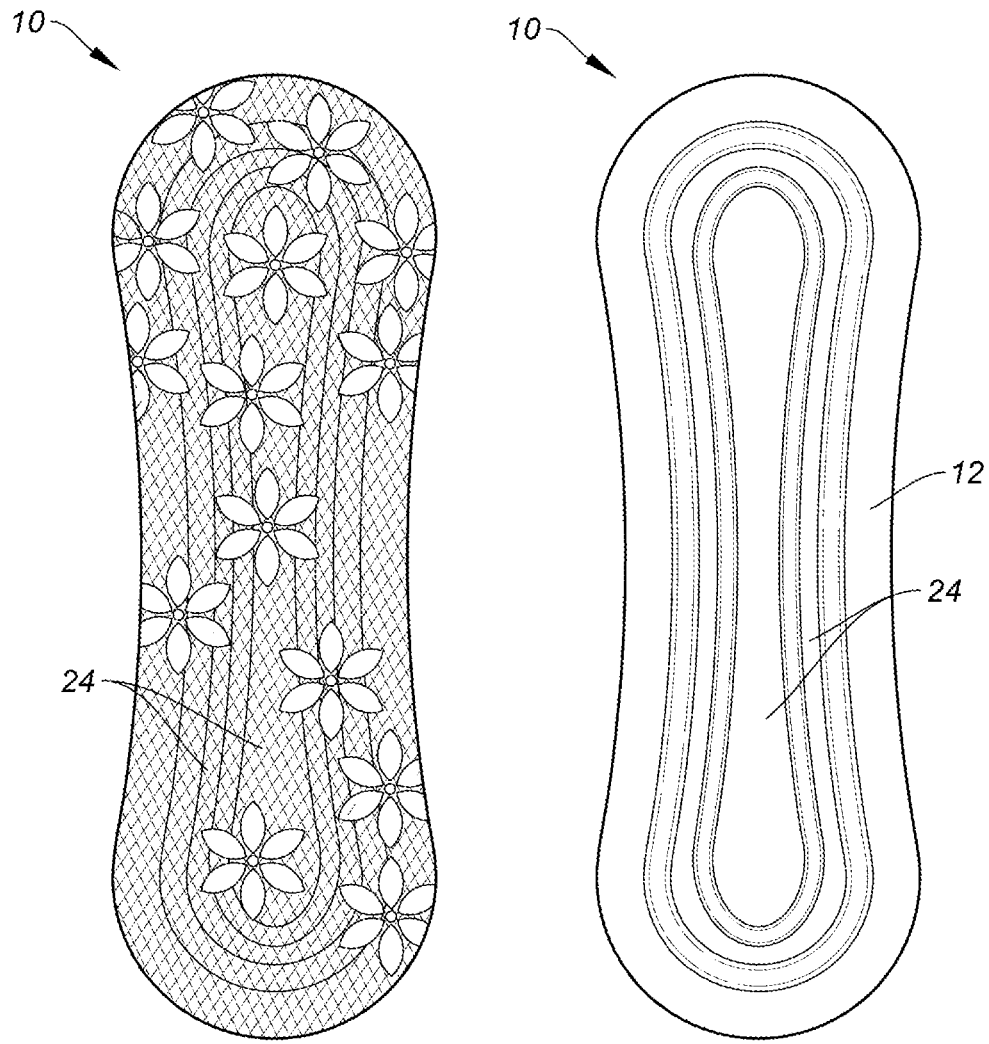
FIGS. 5-6 show top views of embodiments of the present disclosure.
Figures 7, 8:
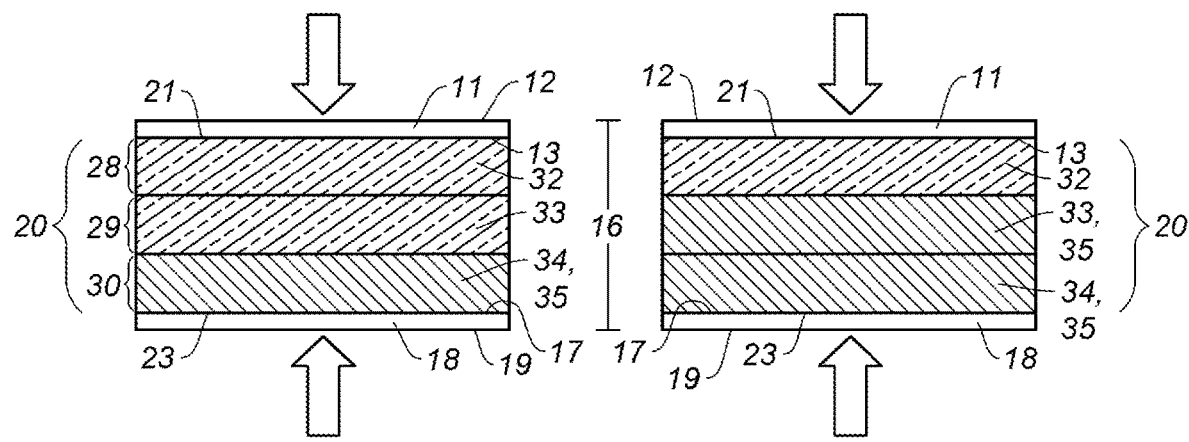
FIGS. 7-10 show schematic views of embodiments of the absorbent core structure of the present disclosure.
Figures 9, 10:
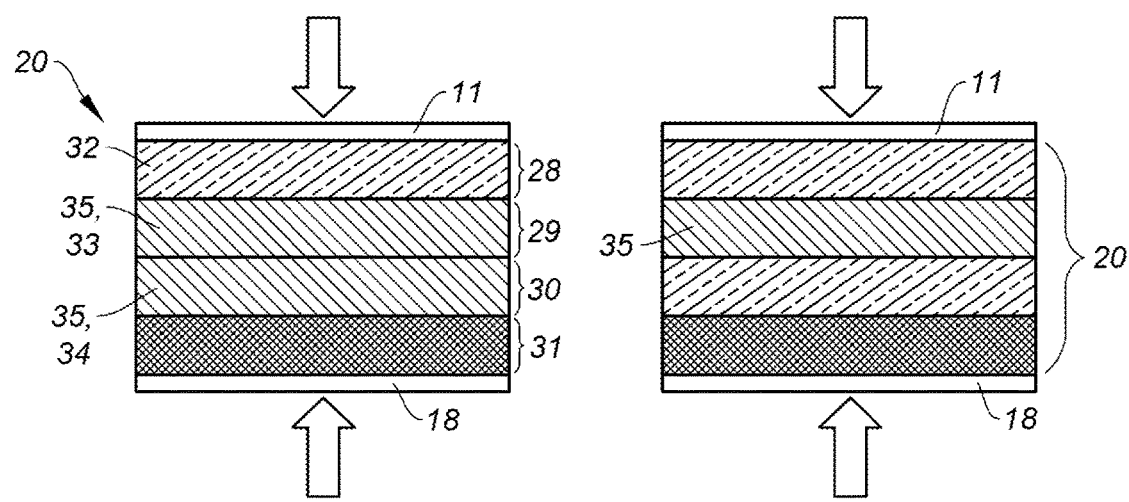

As exemplified in FIGS. 1, 2, 3, 4, 5, and 6, an absorbent article (10) is provided. The absorbent article has a length (14), a width (15), and a thickness (16), and generally includes a top-most (or body-facing) surface (11), often referred to as a cover layer (11). The absorbent article (10) has a backsheet (or barrier layer) (18) opposite the cover layer (11), and generally facing a garment worn by the user. The absorbent article has an absorbent core (20) structure between the cover layer (11) and the backsheet (18). Optionally, absorbent article (10) has a transfer layer (not shown) between the cover layer (11) and absorbent core (20). The arrows in exemplary FIGS. 7-10 demonstrate the layers—cover layer (11), absorbent core (20), and backsheet (18)—being stacked/formed together.

The absorbent article (10) has many shapes, but as shown and preferably for at least ultra-thin products and liner products, a dog-bone, peanut-shape, hourglass, and/or barbell shape is provided. Alternative shapes include generally cylindrical, thong-shaped, and/or hybrids thereof.

Optionally, absorbent articles (10) included colored portions (240 to denote absorbent areas on the product, enhance the perception of depth of the absorbent article, and/or assist in masking fluids that ingratiate the product. Colored portions (24) are on the upper surface (12) of the cover layer (11), lower surface (13) of the cover layer (11), or on/within the absorbent core (20). Colored portions can be varying colors but are preferably a darker color that is easier to see and optionally masks bodily discharge. Such colors are red, blue, violet, and/or green.

The cover layer (11) has a body facing surface (12) and a lower cover surface (13) opposite the body facing surface (12). The body facing surface (12), when used, is directed towards the body of a user such that the body facing surface (12) is at least partially in contact with the user, or at minimum, is the first portion of the absorbent article (10) that is ingratiate with bodily discharge such as fluid. Such fluid includes, for example, urine and/or menses.

In some embodiments, the cover layer (11) is a spunbound or spunlace material. The cover layer (11) includes nonwoven fibers and/or synthetic fibers. The cover layer (11) optionally has bicomponent fibers that are PE/PP. In one embodiment, the cover layer (11) includes a blend of fibers. In some embodiments, polypropylene, polyester, and/or polyethylene fibers are blended together. For instance, polyester and polypropylene fibers are blended, or polyethylene and polypropylene fibers are blended. Such ratios of fibers can be from about 1:3 to about 3:1, respectively, or said differently, between about 25% to about 75%, and between about 75% to about 25%, respectively. In some embodiments, the ratio of fibers can be approximately even, about 1:1, or about 50% each. In some embodiments, the cover layer (11) has a basis weight that is between about 20 gsm and about 50 gsm, or between about 25 gsm and about 30 gsm, or about 27 gsm. In some embodiments, the cover layer (11) is an imaged spunlace that is hydroentangled. In some embodiments, the cover layer (11) has a uniquely configured image or pattern. Cover materials are supplied by manufacturers such as Suominen, Fitesa, and Shalag.

In some embodiments, the cover layer (11) is embossed. The embossing has one or more protrusions (26) separated by one or more channels (27). The one or more protrusions (26) have a protrusion height (38) and a protrusion width (or diameter) (39). The protrusion (27) honeycomb (25) structures are raised on the body facing surface (12) with respect to a cover layer base height (36). In some embodiments, the embossing forms a pattern. In some embodiments, the cover layer (11) has an embossed pattern, the one or more protrusions (26) and the one or more channels (27) in such embossed pattern being a repeating pattern across at least a portion of the absorbent article, such as a first end region (43), a second end region (44), and/or a central region (45), and/or a first lateral region (46), a central length region (48), and/or a second lateral region (47) that is opposite the first lateral region (46). In some embodiments, the embossed pattern is a repeating pattern across substantially the entirety of the absorbent article (10).

In some embodiments, the cover layer (11) has a protrusions (26) and channels (27) forming a honeycomb (25) embossed pattern, the honeycomb shaped protrusions (26) (separated by channels (27)) being a repeating pattern across at least a portion of the absorbent article, such as a first end region (43), a second end region (44), and/or a central region (45), and/or a first lateral region (46), a central length region (48), and/or a second lateral region (27) that is opposite the first lateral region (46). In some embodiments, the honeycomb (25) pattern is a repeating pattern across substantially the entirety of the absorbent article (10). The honeycomb (25) pattern is aesthetically pleasing, is soft and pleasant to the touch (particularly as worn adjacent the body for extended periods of time), imparts the necessary structure to the absorbent article (10) cover layer (11) in order to offer improved performance characteristics. The individual hexagonal structures that are protrusions (26) in the cover layer (11) are separated by channels (27) between about 0.0125 inches and about 0.0375 inches, or between, about 0.025 inches. The individual hexagonal structures in the cover layer (11) have a protrusion height (38) of between about 0.020 inches and about 0.040 inches, and more preferably, about 0.030 inches. Each side (49) of the protrusion (26), or in the exemplary embodiment, the side (49) of the individual hexagonal protrusion (26) has a protrusion length (50) of between about 0.080 inches and about 0.10 inches, or about 0.090 inches. The overall protrusion length (51) of the individual hexagonal protrusion (26) as defined by the midpoint of an exterior side to the midpoint of an opposite exterior side, thereby forming a perpendicular bisector between both sides, is between about 0.15 inches and about 0.20 inches, and more preferably about 0.16 inches to about 0.18 inches, or about 0.17 inches. The width/diameter (39) of the individual hexagonal protrusion (26) is between about 0.20 inches and about 0.30 inches, or between about 0.21 inches to about 0.28 inches.

The absorbent core (20) includes one or more layers referred to as strata. The absorbent core (20) is an airlaid structure, wherein material is deposited onto a substrate. The absorbent core (20) has an upper core surface (21) that is adjacent the lower cover surface (13), and a lower core surface (23) that is adjacent the backsheet upper surface (19). Absorbent core structures can be purchased from manufacturers such as EAM and Glatfelter.

The absorbent core (20) has a first strata (28), a second strata (29), and a third strata (30). The first strata (28) has a first fiber material (32) such as pulp and/or bicomponent fibers. The first strata (28) optionally has super absorbent material such as super absorbent polymer. The second strata (29) has a second fiber material (33) such as pulp and/or bicomponent fibers. The second strata (29) has super absorbent material such as super absorbent polymer. The third strata (30) has a third fiber material (34) such as pulp and/or bicomponent fibers. The third strata (30) optionally has super absorbent material such as super absorbent polymer.

In one embodiment, the first strata (28) and third strata (30) have only fiber material. In such embodiments, this construction is preferable from a manufacturing standpoint as the absorbent core (20) can be placed within an absorbent article (10) such that either of the first strata (28) and third strata (30) face upward such that the lower core surface (23) is adjacent the backsheet upper surface (19). In other words, the absorbent core (20) does not require an orientation step when being assembled into an absorbent article (10).

In another embodiment, only one of the first strata (28) and third strata (30) have only fiber material such that the other also has super-absorbent material such as super absorbent polymer.

In some embodiments, the first fiber material (32) is substantially similar to the second fiber material (33). In some embodiments, the first fiber material (32) is substantially similar to the third fiber material (34). In some embodiments, the second fiber material (33) is substantially similar to the third fiber material (34). In some embodiments, the first fiber material (32), the second fiber material (33), and the third fiber material (34) are substantially similar. In some embodiments, the first fiber material (32), the second fiber material (33), and the third fiber material (34) are the same material and generally within the same tolerances.

In further embodiments, the absorbent core (20) has a fourth strata (31). The fourth strata (31) is positioned adjacent the first strata (28) or the third strata (30). As such, the fourth strata (31) is optionally the lower core surface (23) or the upper core surface (21). The fourth strata (31) includes a tissue material. During manufacturing, the fourth strata (31) having a tissue material is the lower core surface (23) and the first strata (28) is, by virtue of the airlaid process, deposited onto the fourth strata (31). Thereafter, the second strata (29) is laid onto the first strata (28). Thereafter, the third strata (30) is laid onto the second strata (29). As such, the fourth strata (31) acts as a base layer to improve the manufacturing and structure of the absorbent core (20) such that it is more easily transported for final assembly into an absorbent article (10). Further, the fourth strata (31) facilitates a further compact absorbent core (20) having a reduced thickness with respect to the thickness of an absorbent core (20) with three strata.

In embodiments of the absorbent core (20) having three strata, glue is utilized to bind the absorbent core (20) into a discrete structure, enabling transport of the absorbent core (20) for further processing or assembly into an absorbent article (10). In embodiments of the absorbent core (20) that do not have a fourth strata (31) having a tissue material, glue is utilized to bind the absorbent core (20) into a discrete structure, enabling transport of the absorbent core (20) for further processing or assembly into an absorbent article (10).

Surprisingly, it has been found that absorbent cores (31) having a fourth strata (31) do not require orientation within the absorbent article (10). In other words, absorbent properties, such as fluid penetration time and rewet, as discussed in the present disclosure, of the absorbent article (10) are not affected. For example, one skilled in the art would conjecture that fluid penetration time (or P-time) might be improved by having a material with faster wicking properties adjacent the cover layer (11). For example, one skilled in the art would conjecture that rewet would be improved by having an additional layer that would have to be penetrated and bypassed in order for fluid to resurface through the cover layer (11). Surprisingly, the absorbent core (20) having four strata as contemplated by the present disclosure enables an asymmetric absorbent core (20) structure (as defined in regard to a vertical axis (41) extending upward through the core surface and the cover layer) that is neutral with respect to absorbent properties such as fluid penetration time and rewet. Horizontal axis (52) is perpendicular to vertical axis (41), and exemplified on FIG. 1.

In strata having fiber material and super absorbent material, the ratio of fiber to super absorbent material is between about 1.5:1 and about 4:1. In some embodiments, the ratio of fiber to super absorbent material (35) is between about 2.5:1 and about 4:1. In some embodiments, the ratio of fiber to super absorbent material (35) is between about 1.5:1 and about 2.5:1. In some embodiments, the first fiber material (32) has a different fiber to super absorbent material (35) ratio than the second fiber material (33). In some embodiments, the first fiber material (32) has different fiber to super absorbent material ratio than the third fiber material (34). In some embodiments, the second fiber material (33) has a different fiber to super absorbent material ratio than the third fiber material (34). In other embodiments, at least two of the first strata (28), second strata (29), and third strata (30) have the same fiber to super absorbent material ratio. In other embodiments, the first strata (28), the second strata (29), and the third strata (30) have the same fiber to super absorbent material ratio.

The fiber material is between about 40% and about 85% of the total weight of the absorbent core (20). In some embodiments, the fiber material is between about 40% and 70% of the total weight of the absorbent core (20). In some embodiments, the fiber material is between about 60% and 85% of the total weight of the absorbent core (20).

In strata having both pulp and bicomponent fibers, the ratio of pulp to bicomponent fibers is between about 3.5:1 and about 30:1. In a first embodiment, the ratio of pulp to bicomponent fibers is between about 3.5:1 and about 8:1. In a second embodiment, the ratio of pulp to bicomponent fibers between about 10:1 and about 40:1. In such embodiments, the pulp material is between about 40% and about 75% of the total weight of the absorbent core (20). In some embodiments, the pulp material is between about 40% and about 60% of the total weight of the absorbent core (20). In some embodiments, the pulp material is between about 55% and about 75% of the total weight of the absorbent core (20). In such embodiments, the bicomponent fiber is between 1% and 15% of the total weight of the absorbent core (20). In some embodiments, the bicomponent fiber is between 1% and 10% of the total weight of the absorbent core (20). In some embodiments, the bicomponent fiber is between 5% and 15% of the total weight total weight total weight total weight total weight total weight of the absorbent core (20).

The absorbent core (20) includes glue that is between about 0.5% and about 10% of the total weight of the absorbent core (20).

In embodiments having a fourth strata (31), the fourth strata (31) is between about 5% and about 15% of the total weight of the absorbent core (20).

In some embodiments, the ratio of pulp to bicomponent fibers between about 10:1 and about 40:1, where the pulp material is between about 55% and about 75% of the total weight of the absorbent core (20), and the bicomponent fiber is between 5% and 15% of the total weight of the absorbent core (20).

In some embodiments, a further reduced thickness (16) construction is provided for. This further reduced thickness (16) (as exemplified in Table 5 below as "Regular 4 (Thin)") has a ratio of pulp to bicomponent fibers is between about 3.5:1 and about 8:1, where the pulp material is between about 40% and about 60% of the total weight of the absorbent core (20), and the bicomponent fiber is between 1% and 10% of the total weight of the absorbent core (20).

Pulp in the absorbent core (20) is treated or untreated, or a mixture of both treated and untreated. Such pulp is sold by, for example, manufacturers GP Cellulose or International Paper.

Bicomponent fibers are PE-PET and are sold by, for example, GP Cellulose or International Paper.

Glue used as a binder material for the absorbent core (20). One type of binder material is a dispersion binder. The dispersion binder is latex, vinyl acetate and/or ethylene. Some dispersion binders of the present disclosure are aqueous polymer dispersions.

Super absorbent material used in the absorbent core (20) is sold by Sumitomo, Nippon Shokubai, BASF, and Evonik. For example, some super absorbent polymer grades sold by Sumitomo include SA55, SA60, SA65, SA65s, SA70. Super absorbent material is between about 25% and about 40% of the total weight of the absorbent core (20).

The backsheet (18) has a backsheet upper surface (17) that is opposite the backsheet garment facing surface (19). The backsheet upper surface (17) is adjacent the absorbent core (20) and more specifically, the lower core surface (23) of the absorbent core (20). The backsheet garment facing surface (19) is typically positioned adjacent the undergarment worn by a user. The backsheet garment facing surface (19) optionally has releasable adhesive enabling temporary attachment to the undergarment, such that the backsheet garment facing surface (19) can be separated from the undergarment when absorbent article (10) needs to be replaced.

In some embodiments, one or more wings (not shown) extend outwardly from the lateral edges (42) and are attachable to the undergarment. The wings have a releasable adhesive enabling the wings to temporarily adhere to the undergarment such that the wings can be separated from the undergarment when absorbent article (10) needs to be replaced. In embodiments having releasable adhesive on the backsheet garment facing surface (19) and/or wings, the releasable adhesive is covered by release paper and/or an overwrap to keep the absorbent article (10) from sticking to other items prior to use.

The length (14) of the absorbent article (10) is between about 150 mm to about 225 mm. The width (15) of the absorbent article (10) is between about 45 mm to about 70 mm (at its widest portion). The thickness (16) of the absorbent article (10) is between about 0.9 mm and about 3.3 mm. The total weight of the absorbent article (10) is between about 1.3 to about 2.0 g. The absorbent article (10) has a total basis weight (gsm) of less than about 240 gsm, or between about 170 gsm and about 220 gsm.

The absorbent article (10) includes liner embodiments having varying sizes—regular, long, and extra-long. In general, absorbent articles (10) of the present disclosure have a length (14) between about 150 mm and about 220 mm. In general, absorbent articles (10) of the present disclosure have a thickness (16) between about 1 mm and about 3.5 mm. In general, absorbent articles (10) of the present disclosure have a weight (with release paper) between about 1.5 g and about 3 g.

The regular sized liner has a length (14) between about 153 mm and about 158 mm, and a narrowest width (15a) of about 50 mm to about 52 mm, and a largest width (15b) of about 60 mm to about 63 mm. The regular sized liner, without release paper, has a thickness (16) between about 1.7 mm to about 2.2 mm. The regular sized liner, with release paper, has a thickness (16) of 1.7 mm to about 2.2 mm. The regular sized liner, without release paper, has a weight between about 1.2 g and about 1.3 g. The regular sized liner, with release paper, has a weight between about 1.6 g and about 1.8 g.

In another embodiment, the regular liner has a further reduced footprint such that the thickness (16) is between about 1.1 mm and about 1.4 mm. in this embodiment, as exemplified below in Table 4, "Regular 4 (Thin)", additional properties are identified. As with the aforementioned regular products, the length (14) and weights are within the same ranges.

The long liner products have a length (14) of between about 182 mm and about 188 mm. The long liner products have a thickness (16) of between about 1.7 mm and about 2.3 mm. The long liner products have a weight (with release paper) of about 1.9 g to about 2.2 g.

The extra-long liner products have a length (14) of between about 212 mm and about 220 mm. The extra-long liner products have a thickness (16) of between about 1.8 mm and about 2 mm. The extra-long liner products have a weight (with release paper) of about 2.6 g to about 2.7 g.

Procedure for Measuring Fluid Penetration Time (P-Time)

Fluid Penetration Time is measured by placing a sample to be tested under a Fluid Penetration Test orifice plate. The orifice plate consists of a 7.6 cm×25.4 cm plate of 1.3 cm thick polycarbonate with an elliptical orifice in its center. The elliptical orifice measures 3.8 cm along its major axis and 1.9 cm along its minor axis. The orifice plate is arranged on the product sample to be tested at a corresponding location on the absorbent article from which the 37 mm×37 mm test specimens were taken from the product samples tested in the MCB test described above. The longitudinal axis of the elliptical orifice is arranged parallel to the longitudinal axis of the product to be tested.

SPTF 1C (non-Newtonian Synthetic Menstrual Fluid) was used for the following procedure.

Weigh and add 15.7 g of Sodium Chloride (USP grade or equivalent) and 0.16 g of FD&C Blue Dye #1 from BF Goodrich, in a 1 liter volumetric flask. Add distilled water to dissolve, then fill-up to volume. Insert magnetic stirrer and mix for 20 minutes on the stirring plate.

A graduated 10 cc syringe containing 7 ml of test fluid is held over the orifice plate such that the exit of the syringe is approximately 3 inches above the orifice. The syringe is held horizontally, parallel to the surface of the test plate. The fluid is then expelled from the syringe at a rate that allows the fluid to flow in a stream vertical to the test plate into the orifice and a stop watch is started when the fluid first touches the sample to be tested. The stop watch is stopped when a portion of the surface of the sample first becomes visible above the remaining fluid within the orifice. The elapsed time on the stop watch is the Fluid Penetration Time in seconds. The average Fluid Penetration Time (FPT) is calculated from taking the average of three product samples.

Procedure for Measuring Rewet Potential

The three product samples used for the Fluid Penetration Time (FPT) procedure described above are used for the Rewet Potential test described below.

The rewet potential is a measure of the ability of a napkin or other article to hold liquid within its structure when the napkin contains a relatively large quantity of liquid and is subjected to external mechanical pressure. The rewet potential is determined and defined by the following procedure.

The apparatus for the Rewet Potential test is the same as that set forth above with regard to the FPT test and further includes a quantity of 3 inch×4 inch rectangles of Whatman #1 filter paper from Whatman, Inc. Clifton, NJ and a weighing machine or balance capable of weighing to an accuracy of +/−0.001 g, a quantity of said Whatman paper, a standard weight of 2.22 kg (4.8 pounds) having dimensions 5.1 cm (2 inches) by 10.2 cm (4.0 inches) by approximately 5.4 cm (2.13 inches) which applies a pressure of 4.14 kPa (0.6 psi) over the 5.1 by 10.2 cm (2 inches by 4 inches) surface.

For purposes of the test procedure set forth herein, the same three product samples used for the fluid penetration test should be used for the rewet potential test. After the test fluid is applied within the orifice plate in the FPT test described above, and as soon as the cover layer of the napkin first appears through the top surface of the fluid, the stop watch is started, and an interval of 5 minutes is measured.

After 5 minutes have elapsed, the orifice plate is removed, and the napkin is positioned on a hard level surface with the cover layer facing upwards.

A fifteen-layer stack of the pre-weighed filter paper is placed on and centered over the wetted area and the standard 2.22 kg weight is placed on top of the filter paper. The filter paper and the weight are arranged over the absorbent article such that they are centered over the area to which the fluid was applied. The filter paper and the weight are arranged such that their longer dimensions are aligned with the longitudinal direction of the product. Immediately after placing the paper and weight on the product, the stopwatch is started and after a 3-minute interval has elapsed the standard weight and filter paper are quickly removed. The wet weight of the filter paper is measured and recorded to the nearest 0.001 grams. The rewet value is then calculated as the difference in grams between the weight of the wet 15 layers of filter paper and the dry 15 layers of filter paper.

The measurement should have at least three replicates and, if necessary, the weight is wiped clean before each run.

The average rewet value (R) is then calculated from the three measured values and this rewet value (R) may then be used in the Absorbency Index (AI) equation set forth above.

Procedure for Measuring the Average Thickness of a Sanitary Article

The thickness measurement procedure described below should be conducted on three product samples prior to conducting the MCB test described above after the product samples have been removed from any packaging, any release paper has been removed, and after the product has been powdered with talc or the like. The thickness measurement of the product should be conducted at the same location from which the test specimen for the MCB test will be taken.

The absorbent articles according to the present invention preferably have a thickness of less than 2.5 mm, more preferably less than 2.0 mm, and most preferably less than about 1.5 mm. The procedure for measuring the thickness of an absorbent article is described below.

The apparatus required to measure the thickness of the sanitary napkin is a footed dial (thickness) gauge with stand, available from Ames, with a 2" diameter foot at a pressure of 0.07 psig and a readout accurate to 0.001". A digital type apparatus is preferred. If the sanitary napkin sample is individually folded and wrapped, the sample is unwrapped and carefully flattened by hand. The release paper is removed from the product sample and it is repositioned back gently across the positioning adhesive lines so as not to compress the sample, ensuring that the release paper lies flat across the sample. Flaps (if any) are not considered when taking the thickness.

The foot of the gauge is raised, and the product sample is placed on the anvil such that the foot of the gauge is approximately centered on the location of interest on the product sample. When lowering the foot, care must be taken to prevent the foot dropping onto the product sample or undue force being applied. A load of 0.07 p.s.i.g. is applied to the sample and the read out is allowed to stabilize for approximately 5 seconds. The thickness reading is then taken. This procedure is repeated for at least three product samples and the average thickness is then calculated.

Procedure for Determining Average Modified Circular Bend Stiffness (MCB) and Average Basis Weight (BW).

Modified Circular Bend Stiffness (MCB) is determined by a test that is modeled after the ASTM D 4032-82 CIRCULAR BEND PROCEDURE, the procedure being considerably modified and performed as follows. The CIRCULAR BEND PROCEDURE is a simultaneous multi-directional deformation of a material in which one face of a specimen becomes concave and the other face becomes convex. The CIRCULAR BEND PROCEDURE gives a force value related to flexural resistance, simultaneously averaging stiffness in all directions.

The apparatus necessary for the CIRCULAR BEND PROCEDURE is a modified Circular Bend Stiffness Tester, having the following parts:

A smooth-polished steel plate platform, which is 102.0 mm by 102.0 mm by 6.35 mm having an 18.75 mm diameter orifice. The lap edge of the orifice should be at a 45-degree angle to a depth of 4.75 mm;

A plunger having an overall length of 72.2 mm, a diameter of 6.25 mm, a ball nose having a radius of 2.97 mm and a needle-point extending 0.88 mm therefrom having a 0.33 mm base diameter and a point having a radius of less than 0.5 mm, the plunger being mounted concentric with the orifice and having equal clearance on all sides. Note that the needle-point is merely to prevent lateral movement of the test specimen during testing. Therefore, if the needle-point significantly adversely affects the test specimen (for example, punctures an inflatable structure), than the needle-point should not be used. The bottom of the plunger should be set well above the top of the orifice plate. From this position, the downward stroke of the ball nose is to the exact bottom of the plate orifice;

A force-measurement gauge and more specifically an Instron inverted compression load cell. The load cell has a load range of from about 0.0 to about 2000.0 g; and An actuator and more specifically the Instron Model No. 1122 having an inverted compression load cell. The Instron 1122 is made by the Instron Engineering Corporation, Canton, Mass.

In order to perform the procedure for this test, as explained below, three representative product samples for each article to be tested are necessary. The location of the sanitary napkin, or other absorbent article, to be tested is selected by the operator. A 37.5 mm by 37.5 mm test specimen is cut from each of the three product samples at corresponding locations. Prior to cutting the test specimens any release paper or packaging material is removed from the product sample and any exposed adhesive, such as garment positioning adhesive, is covered with a non-tacky powder such as talc or the like. The talc should not affect the BW and MCB measurements.

The test specimens should not be folded or bent by the test person, and the handling of specimens must be kept to a minimum and to the edges to avoid affecting flexural-resistance properties.

The procedure for the CIRCULAR BEND PROCEDURE is as follows. The specimens are conditioned by leaving them in a room that is 21° C., +/−1° C. and 50%, +/−2.0%, relative humidity for a period of two hours.

The weight of each cut test specimen is measured in grams and divided by a factor of 0.0014. This is the basis weight in units of grams per square meter (gsm). The values obtain for basis weight for each of the test specimens is averaged to provide an average basis weight (BW). A test specimen is centered on the orifice platform below the plunger such that the body facing layer of the test specimen is facing the plunger and the barrier layer of the specimen is facing the platform. The plunger speed is set at 50.0 cm per minute per full stroke length. The indicator zero is checked and adjusted, if necessary. The plunger is actuated. Touching the test specimen during the testing should be avoided. The maximum force reading to the nearest gram is recorded. The above steps are repeated until all of three test specimens have been tested. An average is then taken from the three test values recorded to provide an average MCB stiffness or "MCB". Absorbent articles according to the present invention preferably have an average MCB of less than about 250 g, more preferably less than about 230 g, and most preferably less than 165 g. The remaining non-tested product samples are then used for the Absorbency Index test set forth below.

Procedure for Measuring Average Absorbent Capacity (AC)

The samples were further tested to determine the average absorbent capacity (AC) of the products. The test method for determining the average absorbent capacity (AC) is set forth below.

At least three new product samples are required to the conduct the average absorbent capacity test described below.

The average absorbent capacity test is conducted on 37.5 mm×37.5 mm square test specimens cut from the product sample. The cut square 37.5 mm×37.5 mm test specimens are taken from the corresponding product locations as those samples taken from the products used in the MCB and AI tests described above.

Prior to doing the test, at least six 60 mm×60 mm square envelopes are constructed from a lightweight nonwoven such as 0.7 ounce per square yard through air bonded web of bicomponent fibers. A suitable example of the nonwoven material is PGI code #4128. The envelope can be formed by folding a 120 mm×60 mm square section and heat sealing the sides with the sample enclosed. Other envelope constructions can be use as long as they permit unhindered absorption of the test fluid to the sample during the submergence portion of the test and unhindered dripping during the dripping portion.

An envelope, without the test specimen, is submerged in a saline solution (0.9%) for 15 minutes, and then hung so that saline can freely drip for 12 minutes. The wet weight of the envelope is then measured to the nearest one hundredth of a gram. This procedure is conducted for three envelope samples and the average wet weight of the envelope is determined.

The weight of each of the three dry 37.5 mm×37.5 mm test specimens is measured before beginning the test.

A 37.5 mm×37.5 mm test specimen is inserted in a dry envelope and the envelope is submerged in a saline solution (0.9%) for 10 minutes and then hung so that saline can freely drip for 2 minutes. The wet weight of the combined envelope and test specimen are then measured to the nearest one hundredth of a gram. The dry weight of the test specimen and the average wet weight of the envelope alone are then subtracted to determine the absorbent capacity of the test specimen. This is repeated for three 37.5 mm×37.5 mm test specimens and the absorbent capacity average is taken to provide the average absorbent capacity (AC) in grams. The final absorbent capacity reading (as noted in Tables 1-5 below) is taken at 12 minutes from when the sample is submerged, or 2 minutes after it is removed from the saline solution.

Table 1 below shows the improved properties achieved with the teachings of the present disclosure, using procedures generally in-line with the above-noted procedures:

TABLE 1

Comparison of Properties of Current Regular Samples and an Embodiment of NewRegular Samples

| Absorbent Article Property | Units | Control Regular Samples (n = 30) | | | New Regular Samples (n = 30) | | |
| --- | --- | --- | --- | --- | --- | --- | --- |
| | | Average | Min | Max | Average | Min | Max |
| Weight (no overwrap) | Gram (g) | 1.6 | 1.52 | 1.63 | 1.3 | 1.2 | 1.3 |
| Width (narrowest) | mm | 51 | 50 | 51 | 52 | 52 | 52 |
| Width (widest) | mm | 61 | 60 | 62 | 62 | 62 | 63 |
| Length | mm | 156 | 155 | 156 | 156 | 156 | 156 |
| Thickness (center) | mm | 2 | 1.9 | 2.1 | 2.1 | 1.9 | 2.2 |

TABLE 1-continued

Comparison of Properties of Current Regular Samples and an Embodiment of NewRegular Samples

| Absorbent Article Property | Units | Control Regular Samples (n = 30) | | | New Regular Samples (n = 30) | | |
|---|---|---|---|---|---|---|---|
| | | Average | Min | Max | Average | Min | Max |
| Rewet (SPTF) | Gram (g) | 0.28 | 0.24 | 0.31 | 0.25 | 0.22 | 0.28 |
| P-Time | Seconds (s) | 7.5 | 5.7 | 9.0 | 4.0 | 3.0 | 5.5 |
| MCB | Gram (g) | 89 | 67 | 145 | 127 | 108 | 158 |
| Absorbent Capacity (10 min) | Gram (g) | 32 | 30 | 33 | 17 | 16 | 17 |

As shown above, the New Regular [sized liner] Samples as taught by the present disclosure, as tested by the above-noted methods, having similar overall length (14) and width (15) dimensions as current Control Regular [sized liner] Samples, achieved improved rewet and P-time, while delivering a lower weight and thinner absorbent article. The MCB results are supported by consumer perception data suggesting a 90% preference for the flexibility of the new samples versus the current product as exemplified by the control sample. The data is statistically significant as thirty of each sample were tested. The standard deviation and standard deviation mean for P-time on the Control Regular Samples was 0.803 and 0.15, respectively, and the standard deviation and standard deviation mean for P-time on the New Regular Samples was 0.691 and 0.13, respectively. The standard deviation and standard deviation mean for rewet on the Control Regular Samples was 0.0181 and 0.0033, respectively, and the standard deviation and standard deviation mean for rewet on the New Regular Samples was 0.0140 and 0.0026, respectively.

Tables 2 and 5 below demonstrate further properties of new samples as taught by the present disclosure, in regular, long and extra-long sizes.

TABLE 2

Properties of New Regular Samples

| Absorbent Article Property | Units | Regular 1 | | | Regular 2 | | |
|---|---|---|---|---|---|---|---|
| | | Average | Min | Max | Average | Min | Max |
| Weight (with release paper) | Gram (g) | 1.8 | 1.7 | 1.8 | 1.7 | 1.6 | 1.7 |
| Length | mm | 156 | 155 | 156 | 155 | 154 | 155 |
| Thickness (center) | mm | 1.9 | 1.7 | 2.2 | 2.3 | 2 | 3.1 |
| Rewet (SPTF) | Gram (g) | 0.22 | 0.14 | 0.3 | 0.21 | 0.12 | 0.27 |
| P-Time | Seconds (s) | 4.2 | 2.3 | 5.0 | 7.0 | 4.3 | 8.7 |
| MCB | Gram (g) | 161 | 139 | 192 | 153 | 130 | 177 |
| Absorbent Capacity (10 min) | Gram (g) | 17 | 17 | 18 | 17 | 16 | 18 |

TABLE 3

Properties of New Regular Samples

| Absorbent Article Property | Units | Regular 3 | | | Regular 4 (Thin) | | |
|---|---|---|---|---|---|---|---|
| | | Average | Min | Max | Average | Min | Max |
| Weight (with release paper) | Gram (g) | 1.8 | 1.7 | 1.8 | 1.7 | 1.7 | 1.8 |
| Length | mm | 156 | 155 | 156 | 156 | 155 | 156 |
| Thickness (center) | mm | 2 | 1.7 | 2.2 | 1.2 | 1.1 | 1.4 |
| Rewet (SPTF) | Gram (g) | 0.21 | 0.18 | 0.24 | 0.31 | 0.22 | 0.38 |
| P-Time | Seconds (s) | 4.6 | 0.9 | 7.0 | 13.9 | 12.0 | 15.9 |
| MCB | Gram (g) | 178 | 144 | 216 | 163 | 134 | 216 |
| Absorbent Capacity (10 min) | Gram (g) | 17 | 16 | 18 | 12 | 11 | 13 |

TABLE 4

Properties of New Long Samples

| Absorbent Article Property | Units | Long 1 | | | Long 2 | | |
|---|---|---|---|---|---|---|---|
| | | Average | Min | Max | Average | Min | Max |
| Weight (with release paper) | Gram (g) | 2.1 | 2.1 | 2.2 | 2 | 1.9 | 2.2 |
| Length | mm | 184 | 184 | 185 | 184 | 184 | 185 |
| Thickness (center) | mm | 1.8 | 1.7 | 2.2 | 2.1 | 2 | 2.3 |
| Rewet (SPTF) | Gram (g) | 0.2 | 0.12 | 0.25 | 0.22 | 0.15 | 0.28 |

TABLE 4-continued

Properties of New Long Samples

| Absorbent Article Property | Units | Long 1 | | | Long 2 | | |
|---|---|---|---|---|---|---|---|
| | | Average | Min | Max | Average | Min | Max |
| P-Time | Seconds (s) | 3.8 | 2.4 | 5.6 | 5.4 | 3.9 | 6.4 |
| MCB | Gram (g) | 182 | 151 | 230 | 166 | 133 | 192 |
| Absorbent Capacity (10 min) | Gram (g) | 18 | 18 | 19 | 19 | 18 | 20 |

TABLE 5

Properties of New Extra Long Samples

| Absorbent Article Property | Units | Extra Long | | |
|---|---|---|---|---|
| | | Average | Min | Max |
| Weight (with release paper) | Gram (g) | 23 | 2.6 | 2.7 |
| Length | mm | 215 | 214 | 215 |
| Thickness (center) | mm | 1.9 | 1.8 | 2 |
| Rewet (SPTF) | Gram (g) | 0.22 | 0.14 | 0.26 |
| P-Time | Seconds (s) | 3.7 | 2 | 5.2 |
| MCB | Gram (g) | 193 | 153 | 225 |
| Absorbent Capacity (10 min) | Gram (g) | 26 | 25 | 27 |

As shown above by Tables 1-5, in general, absorbent articles (10) of the present disclosure have a p-time of between about 2.3 s and about 15.9 s. Regular liner embodiments (excluding "Thin" embodiments) have a p-time of between about 2.3 s and about 7.0 s. Long liner embodiments have a p-time of between about 2.4 s and about 5.6 s. Extra-long liner embodiments have a p-time of between about 2 s and about 5.2 s. Based on average p-times of the new samples tested (excluding Regular 4 Thin), the new samples have a p-time of 4.6 s versus an average control sample p-time of 7.5 s, which means the new samples are roughly 35% to 40% faster than control (current) products. Based on average p-times of the new samples tested (including Regular 4 Thin), the new samples have a p-time of 5.8 s versus an average control sample p-time of 7.5 s, which means the new samples are roughly 20% to 25% faster than control (current) products. Similarly, average p-time for regular products (excluding Regular 4 Thin) are 4.95 s, which means new regular samples are roughly 30% to 35% faster than control (current) regular products. Similarly, average p-time for the long products are 4.6 s, which means new long samples are roughly 35% to 40% faster than control (current) products. Similarly, average p-time for the extra-long products are 3.7 s, which means new extra-long samples are roughly 45% to 50% faster than control (current) products.

As shown above by Tables 1-5, in general, absorbent articles (10) of the present disclosure have a rewet of between about 0.12 g and about 0.38 g. Regular liner embodiments (excluding "Thin" embodiments) have a rewet of between about 0.12 g and about 0.3 g. Long liner embodiments have a rewet of between about 0.12 g and about 0.28 g. Extra-long liner embodiments have a rewet of between about 0.14 g and about 0.26 g. Based on average rewet of the new samples tested (excluding Regular 4 Thin), the new samples have a rewet of 0.25 g versus an average control sample rewet of 0.28 g, which means the new samples are roughly 5% to 10% better at keeping fluid from resurfacing on the cover layer (11) than control (current) products. Based on average rewet of the new samples tested (including Regular 4 Thin), the new samples have a rewet of 0.26 g versus an average control sample rewet of 0.28 g, which means the new samples are roughly 5% to 10% better at keeping fluid from resurfacing on the cover layer (11) than control (current) products. Similarly, average rewet for regular products (excluding Regular 4 Thin) is 0.215 g, which means new regular samples are roughly 20% to 25% better at keeping fluid from resurfacing on the cover layer (11) than control (current) products. Similarly, average rewet for the long products is 0.21 g, which means new long samples are roughly 20% to 30% better at keeping fluid from resurfacing on the cover layer (11) than control (current) products. Similarly, average rewet for the extra-long products is 0.22 g, which means new extra-long samples are roughly 25% to 30% faster than control (current) products.

As shown above by Tables 1-5, in general, absorbent articles (10) of the present disclosure have a MCB of between about 130 g and about 230 g. Regular liner embodiments (excluding "Thin" embodiments) have a MCB of between about 130 g and about 216 g. Long liner embodiments have a MCB of between about 133 g and about 230 g. Extra-long liner embodiments have a MCB of between about 153 g and about 225 g. Based on average MCB of the new samples tested (excluding Regular 4 Thin), the new samples have a MCB of 165 g versus an average control sample MCB of 89 g. Based on average MCB of the new samples tested (including Regular 4 Thin), the new samples have a MCB of 165 g versus an average control sample MCB of 89 g. Similarly, average MCB for regular products (excluding Regular 4 Thin) is 154 g. Similarly, average MCB for the long products is 157 g. Similarly, average MCB for the extra-long products is 193 g.

As shown above by Tables 1-5, in general, absorbent articles (10) of the present disclosure have an absorbent capacity of between about 11 g and about 27 g. Control (current) regular samples have an absorbent capacity of between about 30 g to 33 g.

In one embodiment, an airlaid absorbent article (10) having a length (14), a width (15), and a thickness (16), comprises: a cover layer (11) having a body facing surface (12) and a lower cover surface (13) opposite to the body facing surface (12); and an absorbent core (2) adjacent to the lower cover surface (13), the absorbent core (20) comprising: a first strata (28) having a first fiber material (32) having at least one of pulp and bicomponent fibers; a second strata (29) having super absorbent polymer (35) and a second fiber material (33) having at least one of pulp and bicomponent fibers; a third strata (30) having a third fiber material (34) having at least one of pulp and bicomponent fibers; a backsheet layer (18) having a backsheet upper surface (17) and a garment-facing surface (19) opposite the backsheet upper surface (17); wherein the absorbent article (10) has a modified circular bend of between about 130 g and about 230 g; wherein the first fiber material (32), the second fiber material (33), and the third fiber material (34) are substantially the same; wherein the ratio of super absorbent polymer

(35) and the second fiber material (32) is between about 1.5:1 and about 4:1; and wherein the thickness (16) of the absorbent article (10) is between about 1.1 mm and about 2.2 mm.

In this document, the terms "a" or "an" are used, as is common in patent documents, to include one or more than one. In this document, the term "or" is used to refer to a nonexclusive or, unless otherwise indicated. It is to be understood that the above description is intended to be illustrative, and not restrictive. For example, the above-described embodiments (and/or aspects thereof) may be used in combination with each other. Many other embodiments will be apparent to those of skill in the art upon reviewing the above description. The scope of the present disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc., as they may be included, are used merely as labels, and are not intended to impose numerical requirements on their objects. In the Detailed Description provided above, various features may be grouped together to streamline the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. An absorbent article having a length, a width, and a thickness, comprising:
   a cover layer having a body facing surface and a lower cover surface opposite to the body facing surface; and
   an absorbent core adjacent to the lower cover surface, the absorbent core having a basis weight of 110 gsm to 170 gsm, the absorbent core comprising:
   a first strata having a first fiber material having at least one of a pulp material and a bicomponent fiber material;
   a second strata having super absorbent polymer and a second fiber material having the pulp material and the bicomponent fiber material;
   a third strata having a third fiber material having at least one of the pulp material and the bicomponent fiber material; and
   a backsheet layer having a backsheet upper surface and a garment-facing surface opposite the backsheet upper surface;
   wherein the absorbent article has a modified circular bend of between about 130 g and about 230 g;
   wherein the absorbent article has an absorbent capacity of between about 11 g and about 27 g;
   wherein the first fiber material, the second fiber material, and the third fiber material are substantially the same;
   wherein a ratio of the super absorbent polymer and the second fiber material is between about 1.5:1 and about 4:1;
   wherein the super absorbent polymer is only within the second strata; and
   wherein the thickness of the absorbent article is between about 1.1 mm and about 2.2 mm.

2. The absorbent article according to claim 1, wherein the absorbent core comprises a fourth strata, the absorbent core comprises a fourth strata, the fourth strata including tissue layer, wherein the fourth strata is adjacent the first strata or the third strata.

3. The absorbent article according to claim 2, wherein the fourth strata is positioned adjacent the lower cover surface.

4. The absorbent article according to claim 2, wherein the fourth strata is positioned adjacent to the backsheet upper surface.

5. The absorbent article according to claim 1, wherein the absorbent core is a discrete component held together by glue.

6. The absorbent article according to claim 1, wherein the cover layer has an embossed protrusion honeycomb structure, wherein the embossed protrusion honeycomb structure are raised on the body facing surface with respect to a cover layer base height.

7. The absorbent article according to claim 6, wherein each of the embossed protrusion honeycomb structure have a protrusion height of between about 0.020 inches (0.5 mm) and about 0.040 inches (1.0 mm), and a protrusion width of between about 0.020 inches (0.5 mm) and about 0.040 inches (1.0 mm).

8. The absorbent article according to claim 7, further comprising at least one channel separating each of the embossed protrusion honeycomb structure, wherein the channels have a channel width of between about 0.0125 inches (0.31 mm) and about 0.0375 inches (0.95 mm).

9. The absorbent article according to claim 1, wherein the absorbent article has a p-time of between about 2.3 s and about 7.0 s.

10. The absorbent article according to claim 1, wherein the absorbent article has a rewet of between about 0.12 g and about 0.28 g.

11. The absorbent article according to claim 1, wherein the thickness is between about 1.1 mm and about 1.4 mm.

12. The absorbent article according to claim 1, wherein the thickness is between about 1.7 mm and about 2.2 mm.

13. The absorbent article according to claim 1, wherein the first fiber material, the second fiber material, and the third fiber material contain the pulp material and the bicomponent fiber material, wherein the absorbent core has a ratio of the pulp material to the bicomponent fiber material of between about 10:1 and about 40:1, where the pulp material is between about 55% and about 75% of a total weight of the absorbent core.

14. An absorbent article having a length, a width, and a thickness, comprising:
   a cover layer having a body facing surface and a lower cover surface opposite to the body facing surface; and
   an absorbent core adjacent to the lower cover surface, the absorbent core having a basis weight of 110 gsm to 170 gsm, the absorbent core consisting of:
   a first strata having a first fiber material having at least one of a pulp material and a bicomponent fiber material;
   a second strata having super absorbent polymer and a second fiber material having the pulp material and the bicomponent fiber material;
   a third strata having a third fiber material having at least one of the pulp material and the bicomponent fiber material; and
   a backsheet layer having a backsheet upper surface and a garment-facing surface opposite the backsheet upper surface;
   wherein the absorbent article has an absorbent capacity of between about 11 g and about 27 g;

wherein the first fiber material, the second fiber material, and the third fiber material are substantially the same;

wherein a ratio of the super absorbent polymer and the second fiber material is between about 1.5:1 and about 4:1;

wherein the super absorbent polymer is only within the second strata; and wherein the thickness of the absorbent article is between about 1.1 mm and about 2.2 mm.

15. The absorbent article according to claim 14, wherein the absorbent article has a modified circular bend of between about 130 g and about 230 g.

16. An absorbent article having a length, a width, and a thickness, comprising:
- a cover layer having a body facing surface and a lower cover surface opposite to the body facing surface; and
- an absorbent core adjacent to the lower cover surface, the absorbent core comprising:
  - a first strata having a first fiber material having at least one of a pulp material and a bicomponent fiber material;
  - a second strata having super absorbent polymer and a second fiber material having the pulp material and the bicomponent fiber material;
  - a third strata having a third fiber material having at least one of the pulp material and the bicomponent fiber material; and
- a backsheet layer having a backsheet upper surface and a garment-facing surface opposite the backsheet upper surface;

wherein the first fiber material, the second fiber material, and the third fiber material are substantially the same;

wherein the absorbent article has a modified circular bend of between about 130 g and about 230 g;

wherein the absorbent article has an absorbent capacity of between about 11 g and about 27 g;

wherein the super absorbent polymer is only within the second strata and wherein a ratio of the super absorbent polymer and the second fiber material is between about 1.5:1 and about 4:1.

17. The absorbent article according to claim 16, wherein the absorbent core has a basis weight of 110 gsm to 170 gsm.

18. The absorbent article according to claim 16, wherein the thickness of the absorbent article is between about 1.1 mm and about 2.2 mm.

* * * * *